United States Patent
Cathry et al.

(10) Patent No.: US 10,086,475 B2
(45) Date of Patent: Oct. 2, 2018

(54) LASER PROCESSING MACHINE

(71) Applicant: BYSTRONIC LASER AG, Niederönz (CH)

(72) Inventors: Daniel Cathry, Roethenbach (CH); Ernest Imboden, Steinhof (CH); Tobias Bugmann, Aarwangen (CH); David Broger, Burgdorf (CH); Thierry Perrin, Aeschi (CH)

(73) Assignee: BYSTRONIC LASER AG, Niederoenz (CH)

( * ) Notice: Subject to any disclaimer, the term of this patent is extended or adjusted under 35 U.S.C. 154(b) by 0 days.

(21) Appl. No.: 15/892,100

(22) Filed: Feb. 8, 2018

(65) Prior Publication Data

US 2018/0161938 A1    Jun. 14, 2018

Related U.S. Application Data

(63) Continuation of application No. 13/703,723, filed as application No. PCT/IB2011/053257 on Jul. 21, 2011, now Pat. No. 9,937,590.

(Continued)

(30) Foreign Application Priority Data

Jul. 22, 2010    (EP) .................................. 10170451

(51) Int. Cl.
*B23K 26/38*     (2014.01)
*B23K 26/04*     (2014.01)
(Continued)

(52) U.S. Cl.
CPC .............. *B23K 26/38* (2013.01); *B23K 26/04* (2013.01); *B23K 26/042* (2015.10);
(Continued)

(58) Field of Classification Search
CPC ...... B23K 26/38; B23K 26/04; B23K 26/042; B23K 26/1494; B23K 26/705; B23K 26/043; Y10T 29/49778
(Continued)

(56) References Cited

U.S. PATENT DOCUMENTS 3,423,593 A * 1/1969 Chinnock ................. G01J 1/02
                                                       250/203.1
3,590,840 A * 7/1971 Hyer .................... B29C 44/0461
                                                         137/806

(Continued)

*Primary Examiner* — Eric Stapleton
(74) *Attorney, Agent, or Firm* — Workman Nydegger (57) ABSTRACT

Laser processing machines, such as laser cutting machine, including a work table receiving workpiece, and work arm with a laser cutting head. Laser cutting head includes nozzle receiving device and nozzle. Via nozzle laser beam may be directed onto work piece. Machine includes main drives moving work arm and/or the laser cutting head on X-Y-Z axes to process work piece, as well as an alignment unit to adjust laser beam. An adjusting station includes receiving unit fixing nozzle and/or the nozzle receiving device during centering of nozzle. The alignment unit has head element in laser cutting head. Head element receives nozzle and/or the nozzle receiving device and is slidable in X-Y directions, via the main drives. Head element may be fixed in a selected position, within the laser cutting head, via clamping device releasable during nozzle centering at adjusting station.

20 Claims, 3 Drawing Sheets

Related U.S. Application Data (60) Provisional application No. 61/374,665, filed on Aug. 18, 2010.

(51) Int. Cl.
*B23K 26/14* (2014.01)
*B23K 26/042* (2014.01)
*B23K 26/70* (2014.01)

(52) U.S. Cl.
CPC ........ *B23K 26/043* (2013.01); *B23K 26/1494* (2013.01); *B23K 26/705* (2015.10); *Y10T 29/49778* (2015.01)

(58) Field of Classification Search
USPC ............... 219/121.67, 407.09; 29/407.09
See application file for complete search history.

(56) References Cited

U.S. PATENT DOCUMENTS

| | | | | |
|---|---|---|---|---|
| 3,692,414 A * | 9/1972 | Hosterman | ............ | G01B 11/24 250/236 |
| 3,736,402 A * | 5/1973 | Mefferd | ............ | B23K 26/10 219/121.67 |
| 3,843,865 A * | 10/1974 | Nath | ............ | B23K 26/0096 219/121.6 |
| 4,335,296 A * | 6/1982 | Bredow | ............ | B23K 26/0853 219/121.67 |
| 4,406,940 A * | 9/1983 | Tsutsumi | ............ | B23K 26/037 219/121.6 |
| 4,427,873 A * | 1/1984 | Orita | ............ | B23K 26/1435 219/121.7 |
| 4,634,832 A * | 1/1987 | Martyr | ............ | B23K 26/0643 219/121.63 |
| 4,644,128 A * | 2/1987 | Palentyn | ............ | B23K 26/08 219/121.67 |
| 4,668,088 A * | 5/1987 | Quinque | ............ | G02B 23/14 219/121.78 |
| 4,675,501 A * | 6/1987 | Klingel | ............ | B23K 26/04 219/121.67 |
| 4,698,480 A * | 10/1987 | Klingel | ............ | B21D 28/12 219/121.39 |
| 4,728,771 A * | 3/1988 | Sartorio | ............ | B23K 26/02 219/121.67 |
| 4,772,772 A * | 9/1988 | Juptner | ............ | B23K 26/034 219/121.63 |
| 4,782,496 A * | 11/1988 | Couturier | ............ | B23K 26/1482 219/121.63 |
| 4,806,726 A * | 2/1989 | Rosa | ............ | B21D 53/88 219/121.39 |
| 4,940,880 A * | 7/1990 | Klingel | ............ | B23K 26/0093 219/121.67 |
| 4,950,861 A * | 8/1990 | Erlenmaier | ............ | B23K 26/0093 219/121.67 |
| 5,008,510 A * | 4/1991 | Koseki | ............ | B23K 26/0093 219/121.7 |
| 5,039,836 A * | 8/1991 | Lemelson | ............ | B23K 15/002 219/121.13 |
| 5,045,668 A * | 9/1991 | Neiheisel | ............ | B23K 26/032 219/121.63 |
| 5,132,510 A * | 7/1992 | Klingel | ............ | B23K 26/0853 219/121.82 |
| 5,272,312 A * | 12/1993 | Jurca | ............ | B23K 26/032 219/121.63 |
| 5,304,773 A * | 4/1994 | Kilian | ............ | B23K 26/04 219/121.78 |
| 5,371,336 A * | 12/1994 | Albert | ............ | B23K 7/102 219/121.39 |
| 5,373,135 A * | 12/1994 | Beyer | ............ | B23K 26/032 219/121.62 |
| 5,463,202 A * | 10/1995 | Kurosawa | ............ | B23K 26/032 219/121.62 |
| 5,463,215 A * | 10/1995 | Alfille | ............ | G01B 11/26 219/121.78 |
| 5,491,318 A * | 2/1996 | Sugawara | ............ | B23K 26/04 219/121.67 |
| 5,525,776 A * | 6/1996 | Okamoto | ............ | B23K 26/0093 219/121.68 |
| 5,536,916 A * | 7/1996 | Kohari | ............ | B23K 26/043 219/121.74 |
| 5,548,098 A * | 8/1996 | Sugawara | ............ | B23K 26/04 219/121.67 |
| 5,667,707 A * | 9/1997 | Klingel | ............ | B23K 26/046 219/121.67 |
| 5,685,999 A * | 11/1997 | Wiedemann | ............ | B23K 26/032 219/121.78 |
| 5,698,120 A * | 12/1997 | Kurosawa | ............ | B23K 26/032 219/121.62 |
| 5,751,436 A * | 5/1998 | Kwon | ............ | H04N 1/10 219/121.68 |
| 5,886,319 A * | 3/1999 | Preston | ............ | B23K 26/032 219/121.72 |
| 5,915,316 A * | 6/1999 | Tajima | ............ | B23K 26/0093 112/155 |
| 5,968,382 A * | 10/1999 | Matsumoto | ............ | B23K 26/034 219/121.67 |
| 5,969,335 A * | 10/1999 | Karasaki | ............ | B23K 26/03 219/121.62 |
| 5,998,768 A * | 12/1999 | Hunter | ............ | G05D 23/27 118/724 |
| 6,031,200 A * | 2/2000 | Whitehouse | ............ | G01B 11/02 219/121.67 |
| 6,040,549 A * | 3/2000 | Kanaoka | ............ | B23K 26/40 219/121.61 |
| 6,044,308 A * | 3/2000 | Huissoon | ............ | B25J 9/1692 700/166 |
| 6,124,565 A * | 9/2000 | Morishita | ............ | B23K 26/1476 219/121.67 |
| 6,188,041 B1 * | 2/2001 | Kim | ............ | B23K 26/034 219/121.6 |
| 6,201,214 B1 * | 3/2001 | Duffin | ............ | B23K 26/04 219/121.66 |
| 6,204,473 B1 * | 3/2001 | Legge | ............ | B23K 26/1476 219/121.67 |
| 6,260,976 B1 * | 7/2001 | Endou | ............ | G02B 26/0825 219/121.67 |
| 6,284,999 B1 * | 9/2001 | Virtanen | ............ | B23K 26/046 219/121.67 |
| 6,288,363 B1 * | 9/2001 | Kaga | ............ | B23K 26/1435 219/121.67 |
| 6,300,592 B1 * | 10/2001 | Ulrich | ............ | B23K 26/06 219/121.67 |
| 6,316,743 B1 * | 11/2001 | Nagahori | ............ | B23K 26/04 219/121.67 |
| 6,326,586 B1 * | 12/2001 | Heyerick | ............ | B23K 26/046 219/121.62 |
| 6,376,798 B1 * | 4/2002 | Remue | ............ | B23K 26/046 219/121.67 |
| 6,392,192 B1 * | 5/2002 | Cole, III | ............ | B23K 26/04 219/121.62 |
| 6,393,687 B1 * | 5/2002 | Friedrich | ............ | B23K 26/0093 219/121.67 |
| 6,417,487 B2 * | 7/2002 | Nagura | ............ | B23K 26/0604 219/121.77 |
| 6,419,146 B1 * | 7/2002 | Buldhaupt | ............ | B21D 26/055 228/157 |
| 6,455,807 B1 * | 9/2002 | Scott | ............ | B23K 26/034 219/121.62 |
| 6,462,301 B1 * | 10/2002 | Scott | ............ | B23K 26/04 219/121.6 |
| 6,528,762 B2 * | 3/2003 | Mayer | ............ | B23K 26/043 219/121.79 |
| 6,580,053 B1 * | 6/2003 | Voutsas | ............ | B23K 26/1435 219/121.6 |
| 6,588,738 B1 * | 7/2003 | Sukuvaara | ............ | B23K 26/06 269/293 |
| 6,649,866 B2 * | 11/2003 | Reichmann | ............ | B23K 26/0665 219/121.84 |

(56) References Cited

U.S. PATENT DOCUMENTS

| | | | | |
|---|---|---|---|---|
| 6,670,574 B1* | 12/2003 | Bates | B23K 26/03 | 219/121.63 |
| 6,693,256 B2* | 2/2004 | Furujo | B23K 26/0665 | 219/121.72 |
| 6,777,641 B2* | 8/2004 | Cole, III | B23K 26/04 | 219/121.67 |
| 6,777,646 B2* | 8/2004 | Schubert | B23K 26/04 | 219/121.75 |
| 6,822,187 B1* | 11/2004 | Hermann | B23K 26/0884 | 219/121.63 |
| 6,833,911 B2* | 12/2004 | Lizotte | B23K 26/04 | 356/71 |
| 6,886,284 B2* | 5/2005 | Lizotte | B23K 26/04 | 42/1.01 |
| 6,934,014 B1* | 8/2005 | Kleinhuber | B23K 26/032 | 219/121.74 |
| 7,005,606 B2* | 2/2006 | Legge | B23K 26/04 | 219/121.82 |
| 7,038,166 B2* | 5/2006 | Denney | B23K 26/032 | 219/121.68 |
| 7,060,932 B2* | 6/2006 | Denney | B23K 26/032 | 219/121.6 |
| 7,124,420 B2* | 10/2006 | Murata | G11B 7/12 | 720/671 |
| 7,180,920 B2* | 2/2007 | Denney | B23K 26/032 | 219/121.68 |
| 7,186,946 B2* | 3/2007 | Byrd | B23K 26/147 | 219/121.71 |
| 7,286,223 B2* | 10/2007 | Denney | B23K 26/03 | 356/318 |
| 7,289,206 B2* | 10/2007 | Denney | B23K 26/03 | 356/318 |
| 7,345,257 B2* | 3/2008 | Yamazaki | B23K 26/04 | 219/121.6 |
| 7,379,483 B2* | 5/2008 | Denney | B23K 26/032 | 219/121.78 |
| 7,407,861 B2* | 8/2008 | Couch | B23K 26/03 | 219/121.67 |
| 7,492,453 B2* | 2/2009 | Denney | B23K 26/03 | 356/318 |
| 7,505,504 B2* | 3/2009 | Sakai | B23K 26/0648 | 372/55 |
| 7,528,344 B2* | 5/2009 | Horn | B23K 26/04 | 219/121.83 |
| 7,570,443 B2* | 8/2009 | Blasenheim | B01L 3/5025 | 359/811 |
| 7,620,085 B2* | 11/2009 | Denney | B23K 26/032 | 372/14 |
| 7,667,159 B2* | 2/2010 | Pailthorp | H01C 17/242 | 219/121.68 |
| 7,848,552 B2* | 12/2010 | Schutze | G01N 1/2813 | 219/121.6 |
| 7,864,315 B2* | 1/2011 | Denney | B23K 26/03 | 356/318 |
| 7,880,114 B2* | 2/2011 | Denney | B23K 26/032 | 219/121.6 |
| 7,880,877 B2* | 2/2011 | Denney | B23K 26/03 | 356/302 |
| 8,040,619 B2* | 10/2011 | Blasenheim | B01L 3/5027 | 359/811 |
| 8,049,132 B2* | 11/2011 | Bouet | B23P 6/007 | 219/121.63 |
| 8,094,303 B2* | 1/2012 | Denney | B23K 26/03 | 356/318 |
| RE43,400 E* | 5/2012 | O'Brien | B23K 26/032 | 219/121.62 |
| RE43,487 E* | 6/2012 | O'Brien | B23K 26/032 | 219/121.62 |
| 8,198,566 B2* | 6/2012 | Baird | B23K 26/083 | 219/121.67 |
| 8,217,301 B2* | 7/2012 | Schmauder | B23K 26/0093 | 219/121.67 |
| 8,228,501 B2* | 7/2012 | Denney | B23K 26/03 | 356/318 |
| RE43,605 E* | 8/2012 | O'Brien | B23K 26/032 | 219/121.62 |
| 8,258,425 B2* | 9/2012 | Denney | B23K 26/032 | 219/121.67 |
| 8,306,079 B2* | 11/2012 | Denney | B23K 26/032 | 219/121.68 |
| 8,314,361 B2* | 11/2012 | Harnisch | B23K 26/38 | 219/121.67 |
| 8,338,743 B2* | 12/2012 | Wanner | B23K 9/0256 | 219/121.64 |
| 8,383,980 B2* | 2/2013 | Yamazaki | B23K 26/046 | 219/121.67 |
| 8,439,811 B2* | 5/2013 | Erlenmaier | B23K 26/1482 | 219/121.67 |
| 8,519,299 B2* | 8/2013 | Schmauder | B23K 26/0093 | 219/121.6 |
| 8,624,158 B2* | 1/2014 | Denney | B23K 26/032 | 219/121.68 |
| 8,638,509 B2* | 1/2014 | Blasenheim | B01L 3/5027 | 359/822 |
| 8,710,398 B2* | 4/2014 | Boynton | B23K 26/26 | 219/121.63 |
| 2002/0177288 A1* | 11/2002 | Brown | B23K 26/0738 | 438/463 |
| 2003/0006221 A1* | 1/2003 | Hong | B23K 26/0604 | 219/121.72 |
| 2003/0014895 A1* | 1/2003 | Lizotte | B23K 26/04 | 42/1.01 |
| 2003/0183608 A1* | 10/2003 | Yamazaki | B23K 26/0853 | 219/121.83 |
| 2003/0192865 A1* | 10/2003 | Cole, III | B23K 26/04 | 219/121.67 |
| 2003/0204283 A1* | 10/2003 | Picard | B23K 10/00 | 700/166 |
| 2003/0234242 A1* | 12/2003 | McCoy | B23K 26/0823 | 219/121.67 |
| 2003/0234243 A1* | 12/2003 | McCoy | B23K 26/0823 | 219/121.72 |
| 2003/0234244 A1* | 12/2003 | McCoy | B23K 26/0823 | 219/121.72 |
| 2004/0027630 A1* | 2/2004 | Lizotte | B23K 26/04 | 359/15 |
| 2004/0029362 A1* | 2/2004 | Liu | B23K 26/032 | 438/460 |
| 2004/0182839 A1* | 9/2004 | Denney | B23K 26/032 | 219/121.78 |
| 2004/0182840 A1* | 9/2004 | Denney | B23K 26/032 | 219/121.78 |
| 2004/0182841 A1* | 9/2004 | Denney | B23K 26/032 | 219/121.78 |
| 2004/0182842 A1* | 9/2004 | Denney | B23K 26/032 | 219/121.84 |
| 2004/0182998 A1* | 9/2004 | Denney | B23K 26/03 | 250/227.14 |
| 2004/0182999 A1* | 9/2004 | Denney | B23K 26/03 | 250/227.14 |
| 2004/0208212 A1* | 10/2004 | Denney | B23K 26/032 | 372/38.02 |
| 2005/0017156 A1* | 1/2005 | Ehrmann | B23K 26/032 | 250/216 |
| 2005/0040150 A1* | 2/2005 | Denney | B23K 26/032 | 219/121.84 |
| 2005/0051523 A1* | 3/2005 | Legge | B23K 26/04 | 219/121.83 |
| 2005/0062583 A1* | 3/2005 | Naumov | H01C 17/242 | 338/195 |
| 2005/0098547 A1* | 5/2005 | Cali | A61F 2/2415 | 219/121.72 |
| 2005/0109738 A1* | 5/2005 | Hewett | B23K 10/00 | 219/121.48 |
| 2005/0167403 A1* | 8/2005 | Petring | B23K 9/095 | 219/121.6 |
| 2005/0213881 A1* | 9/2005 | Leclerc | G02B 6/4231 | 385/31 |

(56) References Cited

U.S. PATENT DOCUMENTS

| | | | |
|---|---|---|---|
| 2006/0049158 A1* | 3/2006 | Schurmann | B23K 9/0956 219/121.83 |
| 2006/0144834 A1* | 7/2006 | Denney | B23K 26/032 219/121.84 |
| 2007/0023405 A1* | 2/2007 | Diem | B23K 26/1476 219/121.84 |
| 2007/0075050 A1* | 4/2007 | Heyl | B23K 26/03 219/121.6 |
| 2007/0075060 A1* | 4/2007 | Shedlov | B23K 26/08 219/121.72 |
| 2007/0088409 A1* | 4/2007 | Bischoff | A61F 9/00827 607/89 |
| 2007/0119829 A1* | 5/2007 | Vietz | B23K 26/04 219/121.63 |
| 2007/0151958 A1* | 7/2007 | Modra | B23K 26/16 219/121.67 |
| 2007/0193987 A1* | 8/2007 | Bischoff | A61F 9/007 219/121.73 |
| 2007/0193988 A1* | 8/2007 | De Joannis De Verclos | B23K 26/08 219/121.78 |
| 2007/0228025 A1* | 10/2007 | Horn | B23K 26/04 219/121.78 |
| 2007/0284345 A1* | 12/2007 | Ando | B23K 26/04 219/121.67 |
| 2008/0000888 A1* | 1/2008 | Schulz | B23K 26/38 219/121.72 |
| 2008/031298 A1* | 2/2008 | Sakai | B23K 26/0648 372/55 |
| 2008/0067331 A1* | 3/2008 | Denney | B23K 26/03 250/227.11 |
| 2008/0212623 A1* | 9/2008 | Bischoff | A61F 9/00827 372/24 |
| 2009/0001063 A1* | 1/2009 | Weick | B23K 26/032 219/121.85 |
| 2009/0021731 A1* | 1/2009 | Denney | B23K 26/03 356/318 |
| 2009/0057283 A1* | 3/2009 | Schmauder | B23K 26/0093 219/121.72 |
| 2009/0152249 A1* | 6/2009 | Petro | B23K 26/0846 219/121.64 |
| 2009/0181838 A1* | 7/2009 | Schmauder | B23K 26/1482 483/16 |
| 2009/0240368 A1* | 9/2009 | Young, Jr. | B23K 31/10 700/166 |
| 2009/0284739 A1* | 11/2009 | Denney | B23K 26/03 356/318 |
| 2010/0044353 A1* | 2/2010 | Olsen | B23K 26/0604 219/121.67 |
| 2010/0071220 A1* | 3/2010 | Thompson | G01C 15/002 33/228 |
| 2010/0134628 A1* | 6/2010 | Pfitzner | B23K 26/03 348/159 |
| 2010/0176103 A1* | 7/2010 | Schulz | B23K 26/0604 219/121.72 |
| 2010/0188669 A1* | 7/2010 | Rushford | G01B 11/272 356/616 |
| 2010/0193482 A1* | 8/2010 | Ow | B23K 26/38 219/121.67 |
| 2011/0102789 A1* | 5/2011 | Denney | B23K 26/03 356/318 |
| 2011/0183271 A1* | 7/2011 | Lee | B23K 26/38 430/323 |
| 2011/0210107 A1* | 9/2011 | Hammann | G05B 19/40937 219/121.72 |
| 2011/0266262 A1* | 11/2011 | Denney | B23K 26/03 219/121.62 |
| 2011/0287607 A1* | 11/2011 | Osako | B23K 26/0608 438/462 |
| 2012/0145687 A1* | 6/2012 | Wolfel | A61F 9/008 219/121.73 |
| 2012/0228274 A1* | 9/2012 | Schmauder | B23K 26/0093 219/121.6 |
| 2013/0068738 A1* | 3/2013 | Schurmann | B23K 26/03 219/121.72 |
| 2013/0126489 A1* | 5/2013 | Buschulte | B23K 26/38 219/121.67 |
| 2013/0134141 A1* | 5/2013 | Santner | B23P 25/006 219/121.72 |
| 2013/0146569 A1* | 6/2013 | Woods | B23K 26/06 219/121.64 |
| 2013/0184839 A1* | 7/2013 | Bauer | G05B 19/409 700/83 |
| 2013/0319980 A1* | 12/2013 | Hesse | B23K 26/032 219/121.62 |
| 2014/0034614 A1* | 2/2014 | Sbetti | B23K 26/032 219/74 |
| 2015/0069028 A1* | 3/2015 | Jennings | B23K 26/0066 219/121.73 |

\* cited by examiner

LASER PROCESSING MACHINE

This application is a continuation of U.S. application Ser. No. 13/703,723, filed on Jan. 22, 2013, which is a 35 U.S.C. 371 national-phase entry of PCT International application no. PCT/182011/053257 filed on Jul. 21, 2011 which claims benefit of and priority to European application no. EP10170451 filed on Jul. 22, 2010, and also claims benefit of and priority as a non-provisional of U.S. provisional application Ser. No. 61/374,665 filed on Aug. 18, 2010; all of which are incorporated herein by reference in their respective entireties, as to all their parts, for all intents and purposes, as if identically set forth in full herein.

TECHNICAL FIELD

Embodiments of present invention relate to a laser processing machine, in particular to a laser cutting machine.

BACKGROUND

Known laser processing machines, e.g. for cutting metallic work pieces, include a laser cutting head on whose end facing the work piece a nozzle is arranged. In the laser cutting head there is a lens that focuses the laser beam. In order to obtain impeccable and uniform cutting results, it would be necessary for the focal point of the bundled laser beam to be at a fixed distance from the work piece surface. Laser processing machines are usually used for cutting out or cutting off contours from sheet metal parts. Processing such work pieces takes place via a laser beam, emanating from an opening of the nozzle, directed onto the work piece to be processed, and guided along a predetermined cutting contour by means of a main drive of the machine.

In terms of the quality of work, that is presently achievable, precise adjustments of the focus position and of the point of impact of the laser beam on the work piece play a decisive role. Thus, to obtain an optimal cutting process with laser cutting machines, the laser beam should be centrically guided through the nozzle of a cutting head, a requirement which is not easy to meet in a practical application. Because lateral displacement of the lenses occurs in the cutting head, caused by, for example, changing the lens or relative sliding of the lenses, one of the lenses may cause a relative displacement of the optical axis. As a result, regular checks and centering and focusing steps are necessary.

Conventionally, the nozzle of laser cutting machines is adjusted in such a manner that the nozzle body is centered in X-Y directions relative to the nozzle head and is then fixed. Such a nozzle centering is carried out by means of adjusting screws or other additional adjusting devices in the X axis or Y axis on the cutting head or on lens slide-in units. Adjusting the focus position (focusing) in the Z axis is usually carried out manually by means of an adjusting screw.

In the present description the term "adjustment" refers on the one hand to nozzle centering in the plane of the nozzle aperture (i.e., positioning of the nozzle in the directions of the X-Y axes), and on the other hand to laser focusing, i.e. adjustment of the focus position (in the direction of the Z axis).

EP-1,561,538 (A1) describes a device for adjusting a laser beam in a laser processing machine. The device includes a work piece receiving unit for receiving and bearing the work piece to be processed, and a laser cutting head. To adjust the laser beam, an alignment unit is provided. The alignment unit is arranged in the direction of propagation of the laser beam in a test station, wherein the laser cutting head is positioned. The alignment unit includes a nozzle fixing element, a projection element for acquiring a projection of the laser beam in an image plane, and an evaluation or comparison unit. In order to facilitate adjustment of the laser beam, in addition an image pattern in the form of a target is overlaid on the monitor of the laser beam, which target shows the desired position of the laser beam as a central point. In this arrangement, position corrections of the laser beam also take place manually by way of adjustment screws.

The above-mentioned manual adjustment of the laser beam by means of adjustment screws and additional adjustment devices installed between the nozzle and the cutting head is too cumbersome, requires considerable time and overall is not suitable to provide adequate cutting quality in accordance with modern requirements.

JP-H10-249,566(A) discloses a laser beam machine for machining of work pieces by a laser beam emitted from a laser generator by means of a condensing lens and by emitting the laser beam to a work piece through a nozzle. The luminance of the laser beam axial center is detected by a sensor having a photo-electric conversion element for making a comparison between the luminance data thus detected and a set luminance at the time when the axial center of the laser beam is preliminarily in the center of the nozzle, so that a deviation is detected between the center of the nozzle and the axial center of the irradiating light axis. On the basis of the deviation data, the nozzle is adjusted by means of an actuator to align the center of the nozzle with the axial center of the irradiating light axis.

But, it is to be noted that by means of this luminance detecting of the laser beam center a really precise and reproducible processing of work pieces of higher quality requirements cannot be carried out.

SUMMARY OF THE INVENTION

Embodiments of the invention provide or relate to systems, devices, and methods for improving laser processing. Embodiments of the invention relate to an improved laser processing machine by means of which faster and more reliable and precise checking and adjustment of centering and focusing of a laser beam in the laser processing machine can be carried out. Consequently, the processing quality of the laser machine can be improved.

Advantageous versions of embodiments according to the invention are also set forth.

Embodiments of the present invention thus relate to a laser processing machine and methods of laser processing, in particular a laser cutting machine that may include:

A work table for receiving a work piece to be processed, if needed;

A work arm with at least one laser cutting head that includes a nozzle receiving device and a nozzle arranged therein, by means of which nozzle a laser beam is to be directed onto the work piece to be processed;

Main drives for moving the work arm with the laser cutting head at least in the directions of X-Y axes for processing the work piece;

An alignment unit for adjusting the laser beam.

Furthermore, according to embodiments of the invention, a special adjusting station is provided in an effective working region of the main drives of the work arm. Said adjusting station includes a receiving unit for fixing the nozzle and/or a nozzle receiving device for centering the nozzle. In this arrangement, the alignment unit is designed in such a manner that in the laser cutting head a head element, for example a core piece, is provided which receives the nozzle and/or the nozzle receiving device and which is arranged so as to be relatively slidable in the X-Y directions, without any additional adjustment device. After the nozzle centering step is performed in the adjusting station, said head element can be fixed, in its adjusted position, in the laser cutting head by means of a releasable clamping unit.

By means of the above measures, the cutting head can be designed in a relatively simple and economical manner because it is possible to do away with the additional adjustment devices necessary with the cutting head according to the state of the art. On the other hand, one of the main advantages of the present invention is that the necessary adjustments for centering the laser beam can be carried out by means of the existing main drives of the machine itself, on the proposed adjusting station of the machine, in a given case by means of a CNC control system.

In one embodiment of the invention, the laser cutting head features a split design, in particular including an upper head section and a lower head section. In this arrangement, the head element, which is arranged so as to be laterally slidable, in the lower head section is designed as a cylindrical core piece that may be connected to the coaxial nozzle receiving device. In one example, the lower head section includes an exterior housing that is attached to the work arm by means of the upper head section. In other words, in the above version, the exterior housing is adjusted by the main drives of the machine to the predetermined extent for centering the laser beam; but during this step the core piece with the cutting nozzle is fixed at the adjusting station.

According to a further feature of the invention the releasable clamping device can include an annular piston which is arranged in an axial annular space of the laser cutting head, for example of the housing, and is movable from a basic position, which affixes the laterally slidable head element, to a second position which undoes the fixation of the laterally slidable head element, and back. The annular piston can, for example, be operated pneumatically in the sense of releasing the clamping. If applicable, the annular piston can be in cooperation on the one hand by means of clamping surfaces of the laterally slidable head element, and on the other hand by means of a clamping unit that acts in the sense of a fixation.

In one embodiment, the clamping unit of the undoable clamping device comprises at least one spring unit, which may include at least three axial spring assemblies.

Thus embodiments of the invention do not need any additional adjusting devices, e.g., servo motors or similar (as is the case in the state of the art), on the cutting head or on the centering support of the laser cutting machine. The actual function of the nozzle centering device is to correctly align the laser beam in the aperture of the nozzle, which is carried out according to embodiments of the invention in such a manner that in the released state of the clamping device the remaining cutting head part is displaced relative to the nozzle in lateral directions (X-Y) exclusively, in one example, by means of the existing main drives of the machine. In this way, semi-automatic or fully automatic nozzle centering can be implemented in a simple manner and without any considerable additional expenditure. This adjustment according to embodiments of the invention has been constructed in such a manner that the movable part of the head section is fixed in the cutting head during the normal cutting operation of the machine.

Beside the cutting region on the machine, but still in the effective operation region of the main drives, the proposed centering support of the adjusting station is arranged, which support serves as a receiving device and affixation device for the nozzle receiving device during the centering step of the nozzle.

BRIEF DESCRIPTION OF THE DRAWINGS

The invention is explained below in more detail with reference to the enclosed drawings that illustrate a preferred exemplary version of the laser processing machine according to the invention, in which.

DETAILED DESCRIPTION

Figure 1:
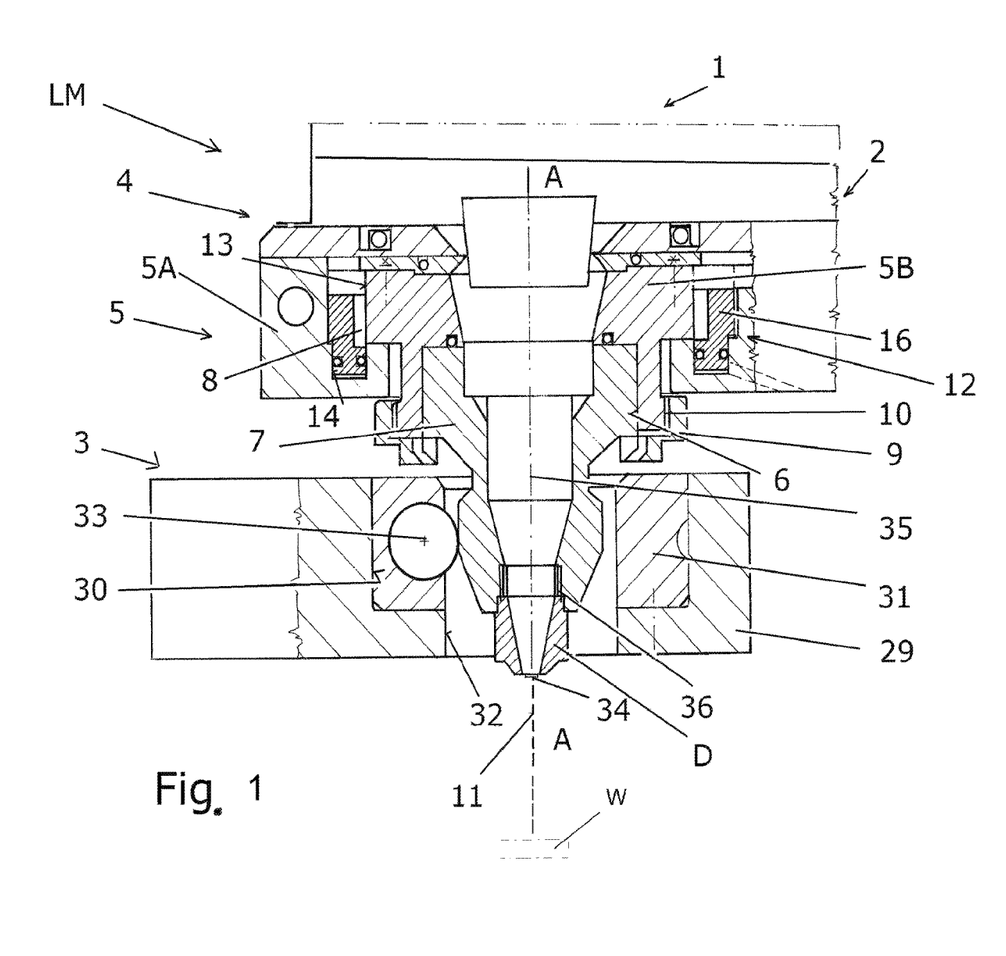
FIG. 1 is a diagrammatic section view of an example of a work arm with a cutting head of the laser processing machine according to the invention in an adjusting station.

FIG. 1 diagrammatically shows an example of a first version, that is, a part of a work arm 1 of a laser processing machine LM according to embodiments of the invention, with a laser cutting head 2 arranged in an adjusting station 3. In one example, the adjusting station 3 is arranged beside a cutting region of the machine LM (not shown), but still in an effective working region of main drives of the machine LM, e.g. on a known work table (not shown).

The work arm 1 comprises, in the present version, known main drives (not shown) with a central control system, for example, a CNC control system The main drives are suitable for moving the work arm 1 together with the laser cutting head 2 according to the coordinates specified in each case (in the directions of the X-Y-Z axes) for processing a work piece W that has been affixed to the work table (e.g. in a manner described in EP-0680805B1, having counterpart U.S. Pat. No. 5,667,707 A which is incorporated by reference, into the present disclosure).

FIG. 1 shows a partial section view of the design and arrangement of the laser cutting head 2 according to the invention. In this version or example, the laser cutting head 2 has a split design; it comprises two parts. The laser cutting head 2 includes an upper head section 4 and a lower head section 5. The upper head section 4 is affixed or attached to the work arm 1 so that it can move together with the work arm 1. In the upper head section 4, optical elements (not shown) of the laser cutting head 2 (lens, lens holder, mirror, etc.) are arranged in a known manner.

However, the lower head section 5 has a special design according to embodiments of the invention. The lower head section 5 includes a laterally displaceable head element and comprises an exterior housing 5A that is disconnectably or removably connected to the upper head section 4. The lower head section 5 also includes a core piece 5B of annular design. The core piece 5B can be laterally displaced relative to the housing 5A for centering a nozzle D of the laser cutting head 2, and can be fixed after adjustment.

In this version or example, the core piece 5B forms the laterally displaceable head element mentioned in the introduction. In a central aperture 6 of the core piece 5B a cylindrical nozzle receiving device 7 is arranged. At its lower end, the nozzle receiving device comprises a thread connection 36 with the coaxial nozzle D (FIG. 1).

In the lower head section 5, i.e. between the housing 5A and the core piece 5B, there is a cylindrical interior space 8 for the lateral relative adjustment of the core piece 5B (see FIGS. 1 and 2), together with the nozzle receiving device 7 and the nozzle D. In FIG. 1 the nozzle receiving device 7 is positionally attached in the aperture 6 of the core piece 5B by means of a union nut 9 that is connected to external threads 10 of the core piece 5B.

Figure 2:
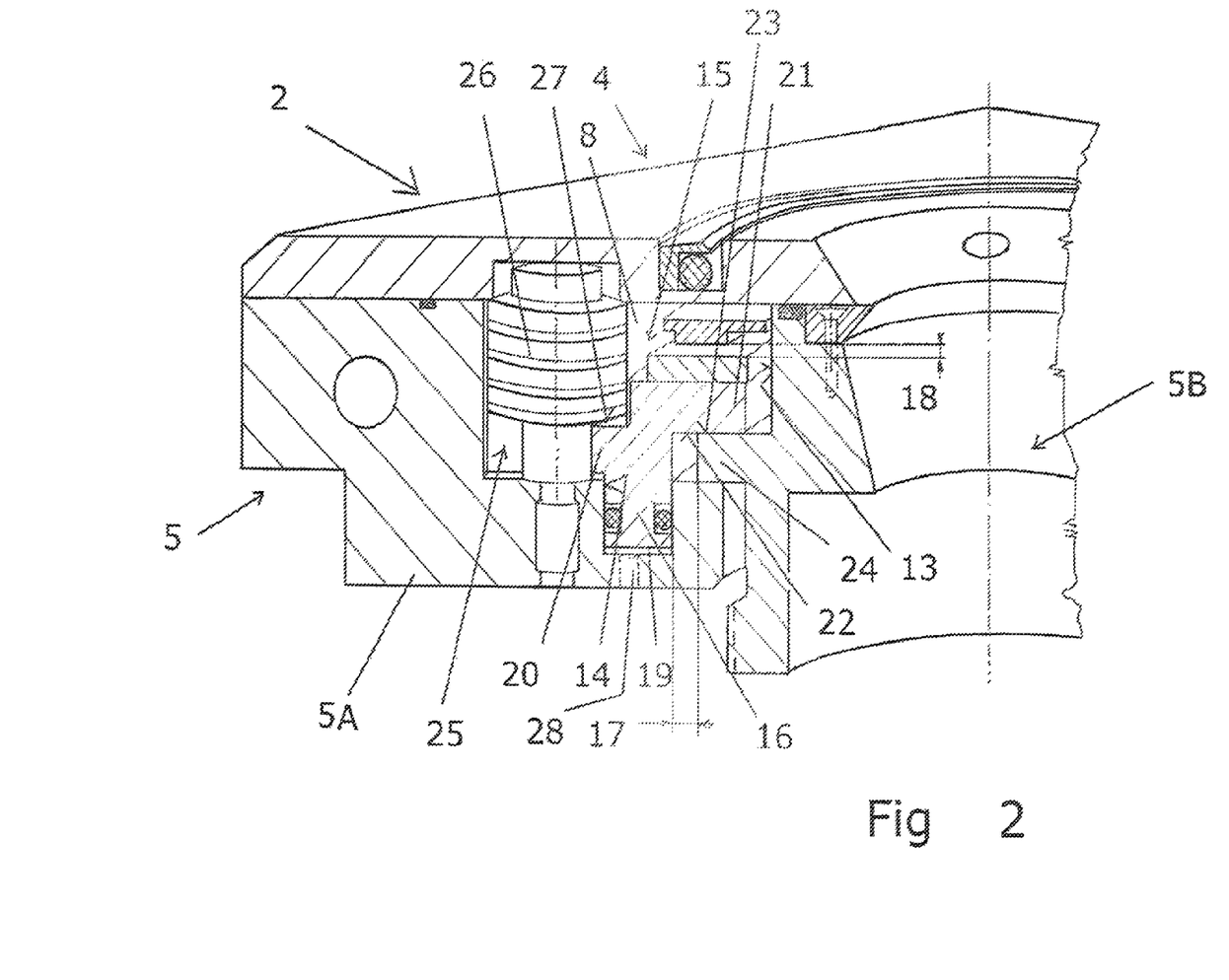
FIG. 2 is a cross section, shown in enlarged scale, of a part shown in FIG. 1.

Thus, according to embodiments of the invention, the mutual radial/lateral position of the core piece 5B can be adjusted together with the nozzle receiving device 7 and the nozzle D (in X-Y directions) relative to the housing 5A for centering the nozzle D, which guides a laser beam 11 through the laser cutting head 2, but without additional adjustment devices between the nozzle D and the work arm 1 (as is the case in the state of the art).

A mirror (not shown) in the upper head section 4 is designed to reflect the laser beam 11 along an axis A-A. When the laser beam 11 is in a centered desired position, the laser beam 11 comes in along the center of the laser cutting head 2 and extends coaxially to a geometrical axis (designated by 35) of the nozzle D (see FIG. 1).

On the one hand, to fix the core piece 5B—together with the nozzle receiving device 7 and the nozzle D—in its centered position, and on the other hand to release this affixation for a new centering/adjustment, a special releasable clamping device 12 is provided and disclosed. In the exemplary version or example, this clamping device 12 is arranged between the housing 5A and the core piece 5B and in this way, a relative X-Y displacement of the core piece 5B with the nozzle receiving device 7 and the nozzle D in the lower head section 5 is made possible. However, this clamping device 12 is constructed in such a manner that the core piece 5B along with the nozzle receiving device 7 and the nozzle D are fixed in the cutting head 2 during the normal cutting operation of the machine LM. This will be explained in more detail below with reference to FIG. 2.

In FIG. 2, the details of the releasable clamping device 12 according to embodiments of the invention are shown more clearly. This clamping device 12 makes possible, as explained above, predetermined relative X-Y displacement of the core piece 5B, together with the nozzle receiving device 7 and the nozzle D, in the lower head section 5 during the centering step. In this exemplary version or example, the annular space 8 is formed between an exterior mantle surface 13 of the core piece 5B and an interior mantle surface 14 of the housing 5A in which, as an actuating unit 15 of the clamping device 12, an annular piston 16 is arranged so as to be slidable in axial direction. In FIG. 2 the radial play of the movable core piece 5B is designated with the reference character 17, while the axial play of the annular piston 16 is designated with the reference character 18. The values of the plays or clearances 17 and 18 are between 1.0 and 5.0 mm in one embodiment.

In this version, a pneumatic working space 19 is provided in the annular space 15 underneath the annular piston 16. In this example, the annular piston 16 comprises a radial exterior flange 20 and a radial interior flange 21. A lower clamping surface 22 of the interior flange 21 is seated on an upper clamping surface 23 of a radial exterior flange 24 of the core piece 5B in the shown affixing home/basic position (see FIG. 2). The radial exterior flange 20 of the annular piston 16 interacts with an elastic clamping unit 25, which in this version or example comprises four spring assemblies 26. These spring assemblies 26 are designed, in one embodiment, in the form of coaxial disc springs and are preferably arranged in the housing 5A beside the annular space 8 so as to be offset from each other by 90°.

This co-operation between the clamping unit 25 and the annular piston 16 includes the lowermost spring element of the spring assemblies 26 (see FIG. 2) continuously pushing downwards an upper supporting surface 27 of the exterior flange 20 of the annular piston 16. In this manner, the co-operation between the clamping unit 25 and the annular piston 16 forces the annular piston 16 into its lower home position shown in which the annular piston 16 jams, i.e. fixes, the core piece 5B, together with the nozzle receiving device 7 and the nozzle D, in its position by means of the clamping surfaces 22 and 23 in the lower head section 5.

If the annular piston 16 is subjected to a pressure medium—in this case to compressed air—through holes 28 and the working space 19, the annular piston 16 moves upwards in axial direction against the spring force of the spring assemblies 26 of the elastic clamping unit 25. In this way the clamping effect of the clamping unit 25 is thus determined.

In this state, the mutual position of the core piece 5B, together with the nozzle receiving device 7 and the nozzle D, as well as of the housing 5A in the lower head section 5 (and also the position to the work arm 1, see FIG. 1) can be easily and reliably centered, between the nozzle D and the work arm 1, without any additional adjusting devices by means of the existing X-Y main drives of the machine LM.

After blocking the flow of compressed air to the working space 19, the spring assemblies 26 press the annular piston 16 downwards again into its home position, in which the core piece 5B, together with the nozzle receiving device 7 and the nozzle D, is jammed or fixed again in its centered position by the clamping surfaces 22 and 23. In other words, this mechanism is constructed in such a manner that the movable part of the construction, i.e. in this version the core piece 5B of the lower head section 5, during normal cutting operation of the machine LM is fixed at all times.

In a given case, according to embodiments of the invention, it is also possible to have such an inverse arrangement in which the laterally movable head element is formed by the housing 5A.

Turning our attention once more to FIG. 1, the adjusting station 3 according to embodiments of the invention is now described in more detail. As mentioned above, the adjusting station 3 is, for example, arranged beside a cutting region, but within the effective region of the present main drives (X-Y-Z) of the laser processing machine LM and is used as a receiving device and affixation device for the nozzle receiving device 7 during centering. To this effect the adjusting station 3 comprises a centering support 29 which is preferably affixed to a frame (not illustrated) beside the work table of the machine LM. In a recess 30 of the centering support 29, a receiving unit 31 is held and fixed.

The receiving unit 31 is thus used as an adjusting unit and comprises a center hole 32 into which in the present case three rollers 33 partly reach in order to center and fix the inserted nozzle receiving device 7 in the adjusting station 3. The three centering rollers 33 are arranged circumferentially along the hole 32, preferably so as to be offset by 120° relative to each other.

In FIG. 1, a hole of the nozzle D is designated by 34 and the geometrical axis of the nozzle is designated by 35, which in the centered state of the nozzle D is coaxial to the axis A-A of the laser beam 11. The above-mentioned thread connection between the nozzle D and the nozzle receiving device 7 is designated in FIG. 1 with reference number 36.

The method of operation of the machine LM according to embodiments of the invention according to FIGS. 1 and 2 is as follows:

If the nozzle D is to be adjusted or centered, the laser cutting head 2 is moved, by means of or by normal adjustment of the work arm 1, to the determined position of the centering support 29 in the adjusting station 3. Thus, the work arm 1 moves the laser cutting head 2 to the adjusting station 3. After this step, the clamping of the core piece 5B, together with the nozzle receiving device 7 and the nozzle D, is released. In one example, the clamping is released by subjecting the annular piston 16 of the clamping device 12 to compressed air through the holes 28. Then, in response to the compressed air, then the annular piston 16 moves upwards in the axial direction against the spring force of the elastic clamping unit 25. In this manner the clamping effect of the clamping unit 25 is thus released.

Thereafter or while the clamping is released, the lower head section 5 can be moved downwards in the direction of the Z axis. More specifically, the movable core piece 5B of the lower head section 5 of the laser cutting head 2—together with the nozzle receiving device 7 and the nozzle D—in its released state is vertically moved to the nozzle receiving unit 31 of the centering support 29 of the adjusting station 3, where it is received and fixed.

Any checking or adjusting of the laser beam 11 can then most easily be carried out in such a manner that from below some plastic tape (not shown) is stuck onto the underside of the nozzle D so that the briefly switched-on laser beam 11 can penetrate it and forms a hole in it. The actual position of this hole thus formed in the plastic tape is, in the simplest case, visually confirmed by the operator. Thereafter the optical position of the laser beam 11 is determined manually or automatically.

In another exemplary version of the invention, the image of the hole is acquired by means of a camera module directed onto the stuck-on plastic tape (in a manner similar to that in EP-1,561,538) and is transferred as an image signal to a monitor (not shown) of the machine LM. The actual position of the hole (and indirectly also of the laser beam) is shown on the monitor for example by means of a target.

If applicable, the hole image of the laser beam 11 can be subjected to an image analysis and can be immediately evaluated in a computer-controlled manner or manually. Thereafter, corresponding corrections of positioning are carried out. However, according to embodiments of the invention, the determined offset of the optical position of the laser beam 11 is correspondingly corrected by means of the present main axes drives X and Y of the machine LM, or by means of the CNC control system. In this way the centering process of the laser beam 11 is completed. In other words, because the clamping is released, relative positions of the core piece 5B and the housing 5A can be adjusted such that the laser beam can be centered.

In this centering method, because the nozzle receiving device 7, together with the nozzle D and the core piece 5B, is fixed in the centering support 29 of the adjusting station 3, the housing 5A of the lower head section 5 can be correctly aligned/adjusted relative to the center and to the geometrical axis 35 of the nozzle D by means of the main axes drives of the machine LM in the direction of the X-Y axes.

Subsequently the core piece 5B, together with the set centered position of the nozzle receiving device 7 and of the nozzle D, is clamped again by activating the clamping device 12 (for example by removing or blocking the compressed air. After this step, the entire laser cutting head 2 can be moved by the work arm 1, from the adjusting station 3 in the direction of the Z axis by means of the main drive. Thereafter the nozzle D is, and remains, reliably fixed in the adjusted and centered state.

Figure 3:
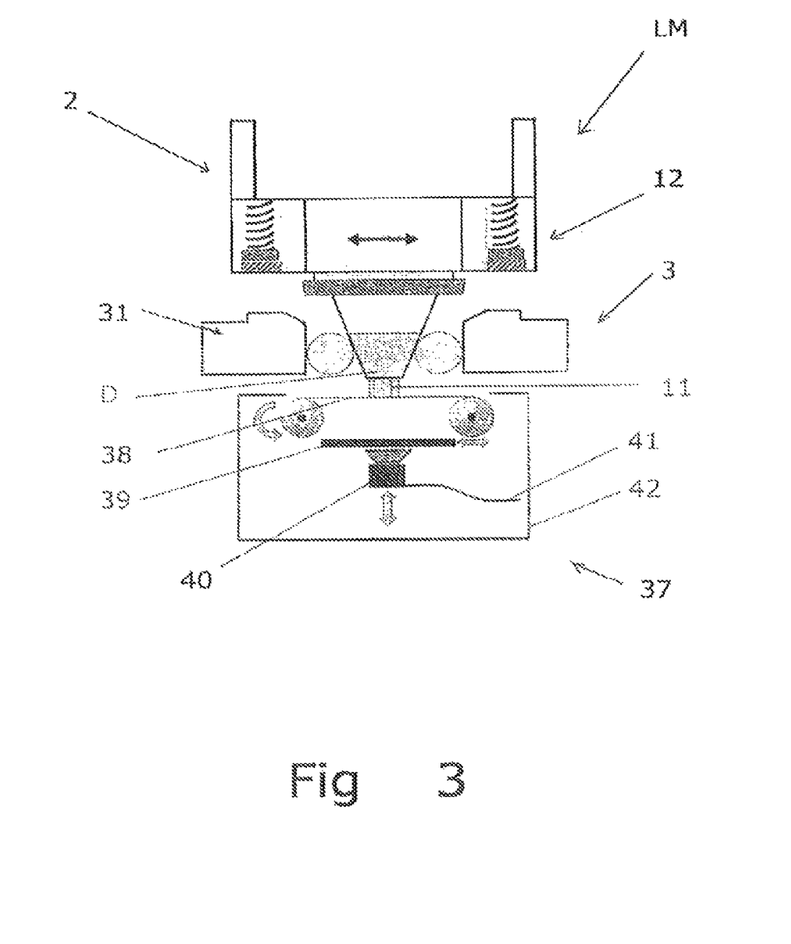
FIG. 3 is a diagrammatic view of another example of the laser processing machine according to the invention in the adjusting station.

FIG. 3 diagrammatically shows a further exemplary version of the laser cutting machine LM according to embodiments of the invention, in which the machine LM according to FIGS. 1 and 2 for the purpose of correctly aligning the laser beam 11 to the nozzle hole of the cutting nozzle D comprises an additional camera system 37 in the adjusting station 3.

For this purpose, in a manner similar to that mentioned above, the nozzle D is locked in the receiving unit 31 of the adjusting station 3, and adjustment itself is accomplished by laterally sliding the remaining cutting head relative to the nozzle D, wherein for this purpose, however, it is necessary to release first the clamping device 12.

In the version shown in FIG. 3 the camera system 37 of the adjusting station 3 comprises
  a target (target piece) 38 that is penetrated by means of a laser pulse (e.g. the target comprises a plastic film or a metal foil that is as thin as possible);
  an absorption plate 39 that can be moved away;
  a height-adjustable camera 40 associated with a known image processing unit 41 (not shown in further detail);
  a housing 42 that provides protection e.g. against dust.

As shown in FIG. 3, the camera system 37, which comprises the target 38, the removable absorption plate 39 and the height-adjustable camera 40, is underneath the receiving unit 31 provided for fixing the nozzle D in the adjusting station 3. The camera 40 is associated with the image processing unit 41.

Before the camera system 37 can be used, a calibration should be carried out:
  with the correctly adjusted nozzle D, a movement into the receiving unit 31 takes place to fix the nozzle;
  the target 38 is transported into one position;
  by means of a laser pulse a hole is made into the target 38;
  the absorption plate 39 is then moved away;
  the camera 40 acquires the hole and stores its position and size; this position is stored as zero in the system;
  the absorption plate 39 is moved back into place.

Subsequently the adjustment method is carried out as follows on the laser cutting machine LM according to the invention, as shown in FIG. 3:
  a) the laser cutting head 2 first moves over the receiving unit 31 of the adjusting station 3;
  b) the clamping device 12 of the laser cutting head 2 is then released;
  c) the laser cutting head 2 is moved into the receiving unit 31 to fix the nozzle;
  d) the clamping device 12 of the laser cutting head 2 is locked;
  e) the target 38 is transported into a predetermined position;
  f) by means of a laser pulse a hole is made in the target 38;
  g) the absorption plate 39 is then moved away;
  h) the camera 40 acquires the size and position of the hole;
  i) the absorption plate 39 is moved back into place;
  j) the position of the hole is compared to the calibration values by means of the image processing unit 41;
  k) if the position of the penetration hole does not coincide with the calibration position, the clamping device 12 of the laser cutting head 2 is released and the error is corrected with the main drives of the machine LM in the CNC axes; the clamping device 12 of the laser cutting head 2 is then locked again;
  l) for control purposes the above-mentioned procedure can be repeated;

m) the laser cutting head 2 is moved out of the receiving unit 31 of the adjusting station 3, and thereafter normal operation of the machine LM can commence.

In a further version or example, the focal position can be determined. To this effect with various focal positions holes are made in the target, which after each "firing" is displaced by one working position. The camera evaluates the holes size. In the smallest hole the focus was in the target.

Embodiments of the invention thus make it possible to achieve a semi-automatic or fully automatic centering of the nozzle, for which, however, no additional servo-motors or other adjusting devices are necessary between the nozzle head and the work arm, as is the case in the state of the art. By embodiments of the invention, the adjustment and construction of the laser cutting machine is significantly facilitated. The solution according to embodiments of the invention make it possible, without much effort, to reliably detect any deviation of the position of the laser beam from the desired/predetermined value, and to carry out suitable, simple, fast and reproducible correction for centering.

It should be emphasized that, within the scope of protection according to the enclosed claims, further embodiments of the laser processing machine according to the invention may be carried out, for which, knowing the present disclosure of the invention, a person having ordinary skill in the art would not, however, require any further technical teaching.

For example, in the releasable clamping device 12 the annular piston 16 could also be operated hydraulically or electro-magnetically. The spring assemblies 26 could, if applicable, be replaced by a coil spring or other spring elements, e.g. pneumatic spring units. In a further embodiment option, the nozzle receiving device 7 and the core piece 5B could be designed as an integrated, preferably single-part element. In this way the construction of the cutting head 5 could be further simplified.

The single annular piston 16 (of the versions shown) could, if applicable, be replaced by piston elements or piston segments that are arranged so as to be offset along the annular gap. Furthermore, such a design is also possible in which the machine LM comprises two or more laser cutting heads 2 (not illustrated).

Of course, it is also feasible for a laser cutting machine to be provided without a work table. This can apply, for example, to mobile laser cutting machines and oversize work pieces where the laser cutting machine is moved towards the work piece, wherein the work piece is affixed elsewhere, or wherein as a result of its size and weight does not require any affixation at all.

The invention claimed is:

1. A process for aligning a laser processing machine laser beam, the method comprising:
   moving a laser head to a nozzle adjustment station with laser head main drives;
   placing a nozzle of the laser head in a nozzle receiving unit of the nozzle adjustment station;
   fixing, in the receiving unit, the nozzle of the laser head against movement under action of the laser head main drives;
   controllably releasing a clamping device in the laser head to allow lateral sliding between the nozzle fixed in the nozzle receiving unit and the laser head;
   aligning a laser beam in the nozzle by repositioning the laser head with the laser head main drives; and
   activating the clamping device to fix the beam-aligned nozzle to the laser head.

2. The process according to claim 1, further comprising:
   applying pneumatic pressure to a piston to controllably release the clamping device in the laser head to allow lateral sliding between the nozzle fixed in the nozzle receiving unit and the laser head; and
   applying spring pressure to activate the clamping device to fix the beam-aligned nozzle to the laser head.

3. The process according to claim 2, wherein the pneumatic pressure acts in opposition to the spring pressure, further comprising removing the pneumatic pressure to allow the spring pressure to activate the clamping device.

4. The process according to claim 1, further comprising aligning the laser beam by respositioning the laser head in the XY directions with the laser head main drives after the clamping mechanism is released.

5. The process according to claim 1, further comprising controlling the clamping device by moving the clamping device from a first position in which said clamping device fixes said laterally-slidable head piece to a second position in which said laterally-slidable head piece is released.

6. The process according to claim 1, wherein said releasable clamping device includes an annular piston, the process further comprising controllably releasing said clamping device by moving said annular piston from a first position, in which said annular piston fixes said laterally-slidable head piece, to a second position, in which said annular piston releases said laterally-slidable head piece.

7. The process according to claim 6, further comprising fixing said clamping device by moving said annular piston from said second position to said first position.

8. The process according to claim 1, further comprising determining a position of the laser beam and then repositioning the laser head to align the laser beam.

9. The process according to claim 8, further comprising determining a position of the laser beam using a target adhered to an underside of the nozzle by forming a hole in the target with a pulse of the laser beam, wherein the laser head is repositioned based on a location of the hole in the target.

10. The process according to claim 9, further comprising determining the location of the hole in the target with a camera by taking an image of the hole.

11. The process according to claim 9, further comprising analyzing the image and repositioning the laser head based on the analysis of the image.

12. The process according to claim 1, wherein repositioning the laser head includes moving the laser head in at least one of X and Y directions.

13. The process according to claim 1, wherein said clamping device includes first and second clamping surfaces, the process further comprising releasing said clamping device by separating said first and second clamping surfaces.

14. The process according to claim 13, further comprising activating said clamping device by bringing said first and second clamping surfaces into contact with each other with a bias force.

15. The process according to claim 1, further comprising positioning the X Y coordinate space with the laser head main drives.

16. A process for aligning a laser processing machine laser beam, of the method comprising:
   moving a laser head to a nozzle adjustment station with laser head main drives;
   placing a nozzle of the laser head in a nozzle receiving unit of the nozzle adjustment station;

fixing, in the receiving unit, the nozzle of the laser head against movement under action of the laser head main drives;

determining a position of the laser beam;

releasing a clamping device in the laser head to allow lateral sliding between the nozzle fixed in the nozzle receiving unit and the laser head;

repositioning the laser head with the laser head main drives based on the determined position of the laser beam such that the laser beam is aligned with respect to the nozzle; and activating the clamping device to fix the beam-aligned nozzle to the laser head.

17. The process of claim 16, wherein determining a position of the laser beam includes:

positioning a target;

performing a laser pulse to form a hole in the target determining a position of the hole in the target; and moving the laser head to align the laser beam in the nozzle based on the position of the hole in the target.

18. The process of claim 16, wherein determining a positon of the laser beam includes:

transporting a target into a predetermined position relative to the nozzle;

positioning an absorption plate underneath the target;

forming a hole in the target with a laser pulse;

removing the absorption plate and acquiring an image of the hole the target with a camera system;

comparing the image of the hole in the target with a calibration position; and if the position of the hole does not coincide with the calibration position, releasing the clamping device and correcting an alignment of the laser beam with the main drives by moving the laser head relative to the nozzle based on an error determined from the position of the hole in the target and the calibration position; and activating the clamping device.

19. The process of claim 16, wherein the clamping device comprises a piston, further comprising releasing the clamping device by introducing a pneumatic pressure to move the piston from a first position in which the laser head is fixed to the nozzle to a second position in which a position of the laser head can be changed relative to the nozzle.

20. The process of claim 19, further comprising removing the pneumatic pressure to activate the clamping mechanism such that the position of the laser head is fixed with respect to the nozzle.

* * * * *